March 29, 1932.   T. ZERBI   1,851,884

DEVICE FOR CAMBERING SPRING LEAVES

Filed Jan. 4, 1930

Inventor
Tranquillo Zerbi,
by Henry Orth Jr
Atty

Patented Mar. 29, 1932

1,851,884

UNITED STATES PATENT OFFICE

TRANQUILLO ZERBI, OF TURIN, ITALY, ASSIGNOR TO FIAT SOCIETÀ ANONIMA, OF TURIN, ITALY

DEVICE FOR CAMBERING SPRING LEAVES

Application filed January 4, 1930, Serial No. 418,618, and in Italy November 29, 1929.

This invention relates to a device for cambering spring leaves which is provided with suitable adjusting means for varying at will the radius of curvature within wide limits.

The characteristic feature of the device consists in the fact that the two pressing surfaces for cambering the spring leaf instead of being continuous are formed by a plurality of small successive surfaces pertaining to two superposed rows of elements connected to one another in the manner of chain links and provided with members for varying at will the relative position of each element with respect to those between which it is comprised in the chain, so that the chamber can be varied within wide limits.

Both chains are carried in an adjustable manner by supporting blocks mounted in the usual cambering machine.

The accompanying drawings show by way of example a constructional form of the device limited to less than one-half of the whole arrangement for clearness' sake.

Figure 1:
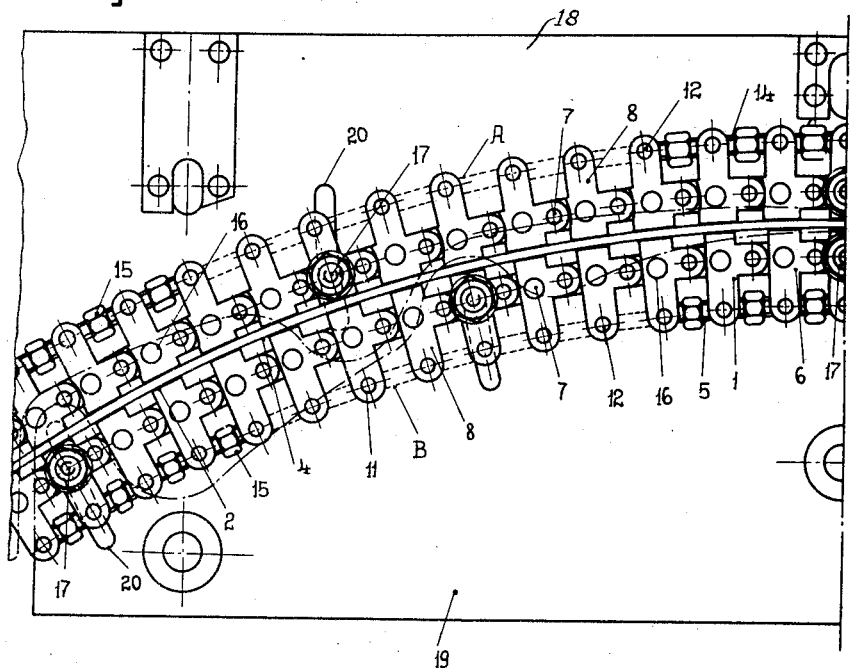
Figure 1 is a partial front view of the device.
Figure 2:
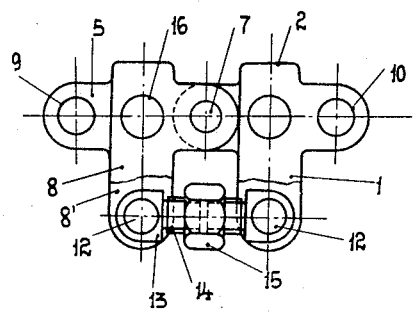
Figures 2 and 3 show on an enlarged scale in front and plan view respectively two successive elements of one of the rows of the device.
Figure 3:
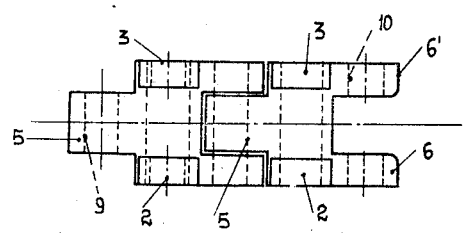

The device comprises two rows of elements A and B, each of which is formed by a body 1 provided with two projecting bearing surfaces 2 and 3 contacting the faces of the leaf 4 to be cambered. Each element 1 carries on one side a sleeve 5 and on the opposite side two flanges 6 and 6' conveniently spaced to permit the sleeve 5 of the adjacent element to engage between them. On the side opposite to the bearing surfaces 2 and 3 the elements 1 carry two parallel projecting arms 8 and 8' conveniently spaced from each other. In the holes 9, 10, respectively, of the sleeve 5 and corresponding flanges 6, 6' are passed the pivots 7 connecting the chain elements. On the ends of the arms 8, 8' are bored coaxial holes 11 through which are passed the pivots 12, on which are mounted the heads 13 of screw-threaded spindles 14 on which are screwed the nuts 15 with one-half right-handed and one-half left-handed screw-thread for drawing together or removing from each other the corresponding spindles 14 which have alternatively opposite screw-threads corresponding to those of the nuts 15.

The elements 1 have a central bore 16 serving for the oil inlet and circulation in the following hardening operation as well as for fitting in bolts 17 for securing the two superposed rows of pressing elements to the plates 18 and 19 of the press. The said bolts 17 are passed in slits 20 correspondingly cut in both plates 18 and 19.

It is obvious that by screwing more or less tightly the nuts 15 of the upper row A and those of the lower row B a very large number of different cambers for the leaves 4 of the spring can be obtained. By providing a plurality of chains A and B of elements 1 of different size it is possible to extend the use of the machine provided with the universal pressing arrangement in order to obtain pressed leaves of any shape with an easy and quick fitting of the press either for making samples or a commercial production with the advantage that the leaves made on a commercial scale shall have the same features as the models chosen for the regular production after practical tests.

The shape of the elements of the two superposed rows according to this application may vary from that shown in the example illustrated without departing from the spirit of this invention.

What I claim is:

1. A mandrel for arcuately bending leaf members, said mandrel comprising arcuately disposed flexible members, said flexible members being formed from links, the ends of said links being hingedly connected together, article engaging heads carried by said links of each flexible member and extending towards each other, said links having their outer sides provided with outwardly extending arms, adjusting members connecting the adjacent arms of the links of each flexible member, said adjusting members comprising turn buckles forming means whereby the links may be adjusted in various arcs.

2. In a device for cambering spring leaves, the combination with dies formed by a succession of cross shaped elements, said elements being hingedly connected together and provided with central transverse apertures and a support for said dies, of attachment plates connecting said dies to the support, bolts passing through said apertures and through slots on said support and tensioning devices rigidly connecting the arms of the cross shaped elements at points remote in relation to a pressing surface.

In testimony that I claim the foregoing as my invention, I have signed my name.

ING. TRANQUILLO ZERBI.